L. B. SMITH.
Can-Openers.
No. 140,088.　　　　　　　　　　Patented June 17, 1873.
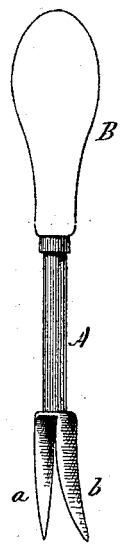
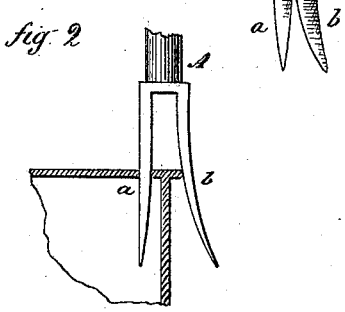

UNITED STATES PATENT OFFICE.

LUCIUS B. SMITH, OF WEST MERIDEN, CONNECTICUT, ASSIGNOR TO HIMSELF AND NORMAN C. HALL, OF SAME PLACE.

IMPROVEMENT IN CAN-OPENERS.

Specification forming part of Letters Patent No. 140,088, dated June 17, 1873; application filed May 28, 1873.

*To all whom it may concern:*

Be it known that I, LUCIUS B. SMITH, of West Meriden, in the county of New Haven and State of Connecticut, have invented a new Improvement in Can-Openers; and I do hereby declare the following, when taken in connection with the accompanying drawing and the letters of reference marked thereon, to be a full, clear, and exact description of the same, and which said drawing constitutes part of this specification, and represents, in—

Figure 1, a perspective view; and in Fig. 2, the method of using the opener.

This invention relates to an improvement in device or cutter for opening sheet-metal cans, the object being to adapt the cutter to work near and parallel with the edge of the can, whether it be square or cylindrical; and the invention consists in a pair of cutters formed upon a shank and provided with a handle, one of the said cutters straight and the other curved, one cutter forming a guide when the other is used.

$a$ is one cutter, and $b$ the other, formed upon a shank, A, and provided with a handle, B. These two cutters are distant from each other only so far as it is desirable that the cut should be made from the edge of the can. The cutter $a$ is made straight and parallel with the axis of the shank; the other cutter $b$ is curved outwardly, as seen in Figs. 1 and 2, and the cutters are, preferably, made sharp upon both edges, and pointed so as to be easily introduced through the metal to be cut.

To use the cutter for the opening of a square can, or can with straight edges, force the straight cutter $a$ through the can, the other cutter, $b$, passing down outside the can; then depress the handle to force up the cutter; the connected ends of the cutters resting upon the can as a fulcrum cause the cutter to slit the metal; then, forced along, working the handle up and down, the outside cutter serving as a guide to hold the cutter in line near the edge of the can.

For a cylindrical can, or can with curved sides, the curved cutter is used in like manner, in this case the straight cutter running outside the can as a guide.

I claim as my invention—

The combination of the two cutters $a$ $b$, one of which is straight and the other curved outwardly, the two united at their upper end and attached to or made a part of the shank B, and provided with a suitable handle, substantially as described.

LUCIUS B. SMITH.

Witnesses:
O. H. PLATT,
JAMES E. BELDEN.